United States Patent [19]

Bingham

[11] 4,263,345
[45] Apr. 21, 1981

[54] COATING COMPOSITION FOR FORMING RETROREFLECTIVE TREATMENTS ON FABRICS

[75] Inventor: Wallace K. Bingham, North Saint Paul, Minn.

[73] Assignee: Minnesota Mining and Manufacturing Company, St. Paul, Minn.

[21] Appl. No.: 94,696

[22] Filed: Nov. 16, 1979

[51] Int. Cl.³ .............................................. G02B 5/12
[52] U.S. Cl. .............................. 427/163; 260/29.6 R; 428/260; 428/290; 428/308
[58] Field of Search .................... 260/29.6 R; 427/163

[56] References Cited

U.S. PATENT DOCUMENTS

| 2,963,378 | 12/1960 | Palmquist et al. ............ 260/37 R X |
| 3,099,637 | 7/1963 | Nellessen ............................... 260/40 |
| 3,228,897 | 1/1966 | Nellessen ........................ 260/33.6 R X |
| 3,420,597 | 1/1969 | Nellessen et al. ................ 427/273 X |
| 3,535,019 | 10/1970 | Longlet et al. .................. 428/406 X |
| 3,700,305 | 10/1972 | Bingham ............................. 350/105 |
| 3,835,087 | 9/1974 | Searight et al. ................ 260/33.6 R |
| 4,103,060 | 7/1978 | Bingham et al. ................ 427/163 X |

FOREIGN PATENT DOCUMENTS 935254 10/1973 Canada .

Primary Examiner—James R. Hoffman
Attorney, Agent, or Firm—Cruzan Alexander; Donald M. Sell; Roger R. Tamte

[57] ABSTRACT

Coating compositions for use in making fabrics brightly retroreflective at nighttime comprise a dilute coating vehicle and transparent retroreflective microspheres dispersed in the vehicle at a low concentration. The coating on the fabric is inconspicuous in daylight and leaves the garment with substantially its normal hand, feel, and breathability.

7 Claims, 1 Drawing Figure

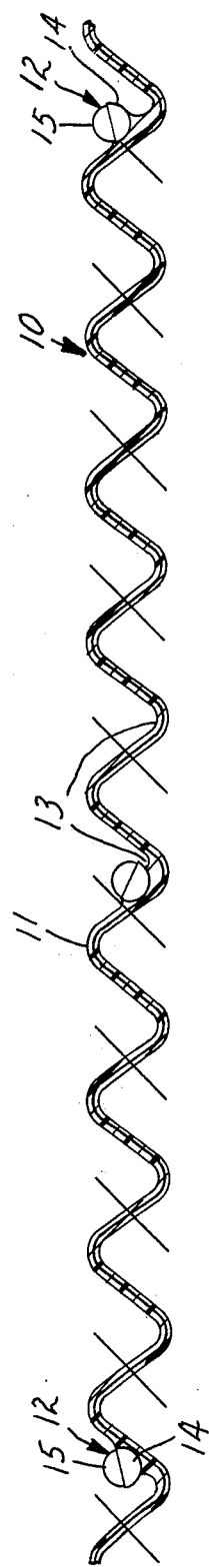

COATING COMPOSITION FOR FORMING RETROREFLECTIVE TREATMENTS ON FABRICS

The present invention provides new coating compositions useful for coating fabrics to form superior retroreflective treatments of the type taught in Bingham and Bailey, U.S. Pat. No. 4,103,060. Retroreflective treatments taught in the stated patent comprise retroreflective glass microspheres adhered over the surface of a fabric in a low-density, scattered or spaced arrangement. Such treatments are difficult to detect under ordinary daylight viewing conditions, but are brightly retroreflective when viewed in the dark under retroreflective viewing conditions (i.e., with the observer located on substantially the same axis as a light beam shined at the fabric). The low daytime visibility of these treatments gives promise of overcoming a resistance that consumers have demonstrated toward prior retroreflective treatments, which were readily visible during ordinary or casual viewing in daylight. Although retroreflective treatments can greatly increase the safety of a pedestrian walking along a roadway at nighttime, few persons have worn them, presumably because of the daytime visibility of the retroreflective treatment.

Compositions of the present invention may be coated onto a wide range of fabrics to provide retroreflective treatments that are especially difficult to detect under ordinary daylight viewing conditions. Briefly, a composition of the invention comprises (a) a dilute coating vehicle that comprises film-forming binder material and at least 40 volume-percent volatile constituent, and (b) transparent microspheres having a refractive index between about 1.85 and 2 hemispherically coated with specular reflective means and dispersed in the coating vehicle in an amount accounting for no more than about one-third of the volume of the nonvolatile portion of the composition.

A composition as described can be coated onto a fabric, as by spreading with a knife blade, coating from a rotogravure cylinder, or spraying, to provide a sparse distribution of microspheres over the surface of the fabric. The binder material in the coating vehicle becomes distributed across the surface of the fabric, and upon drying and/or reaction forms a thin layer holding the microspheres to the fabric. Individual microspheres are partially embedded in the layer and partially protrude above the layer. The microspheres may be randomly oriented, but typically, on the average at least one-third of them are arranged with the hemispherical reflector between the microsphere and the fabric, and with the outwardly facing surface of the microspheres optically exposed.

Some useful characteristics noted in the coating include:

(1) The microspheres are well distributed across the surface of the fabric. By choice of the volume-percent of microspheres in the composition, the microspheres can be distributed at densities within the parameters taught in the previously noted Bingham and Bailey, U.S. Pat. No. 4,103,060, i.e., at a density of no more than about 2000, and preferably no more than about 500, per square centimeter of the coating.

(2) Any concentrations of microspheres are small, with many of the microspheres isolated or separated from other microspheres of the treatment. The maximum surface dimension of discrete retroreflective areas, i.e., concentrations or clusters of microspheres that are seen as one retroreflective area during retroreflective viewing, is no more than about one millimeter.

(3) The microspheres tend to nestle in recesses in the surface of the fabric, i.e., in the valleys or interstices between yarns of the fabric. This nestling minimizes removal of the microspheres during ordinary use and reduces daylight visibility of the microspheres. Coating compositions of the invention are useful on a wide variety of fabrics, including tightly woven fabrics such as nylon used in exterior shells for jackets and coats.

Overall, a treatment of the invention is difficult to detect in daylight viewing. The microspheres are very small, often on the order of 50 micrometers in diameter or less, and even clusters of microspheres are not easily visible. Individual microspheres isolated from other microspheres are especially hard to detect (visual acuity of the human eye is typically regarded as one minute of arc for subjects illuminated under normal lighting conditions of 100–1000 foot-lamberts; at viewing distances of 15 and 30 inches, one minute of arc covers, respectively, 0.0043 inch (110 micrometers) and 0.0087 inch (221 micrometers)).

In contrast to their daytime inconspicuity, garments treated with coating compositions of the invention are brightly retroreflective at night when illuminated by the headlight beam of a vehicle. Under such retroreflective viewing conditions, each properly oriented microsphere sends back a pinpoint of light, and in the aggregate, the myriad pinpoint reflections make the fabric bright and visible.

PRIOR ART STATEMENT

Retroreflective coating compositions based on hemispherically reflectorized glass microspheres were taught in Palmquist et al, U.S. Pat. No. 2,963,378, and further teachings appear in Nellessen, U.S. Pat. Nos. 3,099,637; 3,228,897; Nellessen et al, U.S. Pat. No. 3,420,597; Longlet et al, U.S. Pat. No. 3,535,019 (compositions particularly intended for coating fabrics); Searight, U.S. Pat. No. 3,835,087; and Hogseth et al, Canadian Pat. No. 935,254.

These prior-art coating compositions were generally intended to provide coatings having as dense a concentration of microspheres as possible. For that reason, microspheres constituted a large proportion, i.e., 50 volume-percent or more, of the nonvolatile components of the composition. Based on the principles and objectives of these prior-art teachings, a reduction of the concentration of microspheres to the amounts used in the present invention would take away utility.

Compositions taught in columns 6 and 7 of the above-listed U.S. Pat. No. 2,963,378 are an exception to the prior-art practice of high loading, but other differences make these compositions unsuitable for treating fabric. These compositions were intended to provide flat-surfaced coatings and for that reason used high-refractive-index (e.g., 2.5-index or higher) glass microspheres which will retroreflect only when totally embedded in transparent resin of appropriate index (in contrast to the microspheres in compositions of the present invention, which are of low index and retroreflect when exposed to air). Also, the microspheres were quite small (less than 25 microns in diameter) and the compositions included higher concentrations of nonvolatile binder materials than preferred for the present invention; and a second coating of binder material was applied over the microsphere-containing first coating, leaving a glossy smooth resinous outer surface not in any way suitable for reflective fabrics prepared by the present invention.

In summary, none of these prior-art teachings suggests coating compositions that may be coated onto fabrics to leave microspheres sparsely distributed across the surface of the fabric and partially embedded in a layer of binder material; and none of them suggests the surprising properties of daytime inconspicuity and nighttime retroreflectivity that such a treatment provides.

DESCRIPTION OF THE DRAWING

The drawing is a schematic representation in section of a fabric 10 that has been retroreflectorized with a composition of the invention. The retroreflective treatment comprises a coating or thin layer 11 of binder material in which hemispherically reflectorized microspheres 12 are partially embedded. The microspheres tend to be deposited in recesses or valleys 13 of the fabric, and may be randomly oriented. Typically at least about one-third of the microspheres are oriented with their hemispherical reflective cap 14 disposed between the microsphere and the fabric and with the outwardly facing surface 15 of the microsphere optically exposed so as to receive light rays.

DETAILED DESCRIPTION

Binder materials that are useful for incorporation into coating compositions of the invention are already well known in the fabric-treating industry, where such binder materials have been used for textile printing (as for ornamental purposes), water-proof coatings, flocking binders, etc. These useful binder materials form durable adherent films when coated on a fabric and exposed to an appropriate environment.

Aqueous emulsions of acrylic-based polymers are preferred binder materials, because of the advantages of water as an inexpensive, convenient, and environmentally safe diluent, and because the acrylic polymers provide a durable well-adhered layer that leaves the fabric supple and flexible. A fabric treated with such binder materials can generally be folded upon itself without fracturing the coated layer of binder material, and the fabric will generally handle and feel approximately the same way after treatment as it did before treatment. These aqueous emulsions of acrylic-based polymers dry upon evaporation of water and coalesce as a continuous film. Typically they also can be subsequently reacted to a more insoluble infusible state as by heating. Such a reacted binder material is not readily soluble in usual dry cleaning solvents.

Other useful binder materials for use in the coating vehicle of compositions of the invention are vinylidene chloride-based copolymers, polyesters, and polyurethanes. Although preferred reactive binder materials are one-part compositions which may be activated by application of heat, etc., two-part compositions stored separately until the time of coating can also be used.

To minimize the effect of the layer of applied binder material on the fabric, the layer is preferably very thin. Such thinness can be achieved by making the coating vehicle dilute; generally the vehicle includes at least 40 volume-percent, and preferably at least 70 volume-percent, of a volatile constituent, e.g., as a volatile liquid in which latex particles are dispersed or as a solvent or thinner. Although water is a preferred volatile constituent, organic liquids may also be used.

As discussed above, the number of microspheres within the composition is kept low, so as to provide the low densities of microspheres on fabric which provide desired daytime inconspicuity. Different degrees of daytime inconspicuity will be accepted for different kinds of garments and fashion schemes, and certain fabrics will achieve good daytime inconspicuity even with higher loadings of microspheres. Where full daytime inconspicuity is not needed, the microspheres may comprise up to about one-third of the volume of the nonvolatile ingredients in the composition; but more typically the microspheres comprise less than about one-fifth of the volume of the nonvolatile ingredients in the composition. The combination of daytime inconspicuity and retroreflectivity that seems preferred today is obtained with loadings of microspheres at levels less than about 15 volume-percent.

Generally sufficient microspheres are included in a composition to provide a reflective treatment that exhibits at least 1 candella, and preferably at least 2.5 or 3 candellas, of reflected light per square meter of a treated surface per lux of light that is incident of the surface.

Since the microspheres constitute only a small percentage of the coating composition, they should be well dispersed within the composition immediately prior to application to a fabric. Such a dispersion can be achieved with mechanical stirring techniques. In addition, thixotropic agents such as carboxylmethyl cellulose and polyacrylates can be added to the composition.

The microspheres included in the composition are visibly transparent, usually glass, and are preferably colorless in most embodiments of the invention. Where a hemispherical reflector is applied directly to the microsphere, as is most common, the index of refraction of the glass will be in a range between 1.85 and 2.0, and preferably will be slightly over 1.9. Microspheres of lower refractive index can be used by spacing the hemispherical reflector from the microsphere, as by precoating a glass microsphere with a material of lower refractive index. And microspheres of high index of refraction can be used in mixture with lower-index microspheres to obtain useful retroreflection when the microspheres are wet. The microspheres are generally less than 200 micrometers in average diameter, and preferably are less than 100 micrometers in average diameter, to minimize their visibility on treated fabric.

Procedures for hemispherically reflectorizing microspheres are taught in Palmquist et al, U.S. Pat. No. 2,963,378. Vapor-coated aluminum is the preferred hemispherical reflective coating, but dielectric coatings such as taught in Bingham, U.S. Pat. No. 3,700,305 (which is incorporated herein by reference) might also be used. Barrier films, such as aluminum phosphate or aluminum oxide films, may be applied over a metal hemispherical coating in the manner taught in Longlet et al, U.S. Pat. No. 3,535,019 to increase the shelf-stability of compositions of the invention. Alternatively or in addition, additives such as 6-acetoxy-2,4-dimethyl-m-dioxane or trans-1,2-bis(n-propylsulfonyl)ethylene may be included in the coating vehicle to increase shelf-stability; these additives are understood to inhibit microbial growth.

A variety of other additives may be included in the composition to achieve special results. For example, antifoaming agents may be included in the coating vehicle to minimize foaming of the vehicle as it is beng formulated or when it is applied to a fabric. Other additives which may be included in the composition are organofunctional silanes and transparent pigments and dyes, which are included as adhesion aids or coupling agents and as camouflaging or coloring compounds.

The preferred technique for applying a coating composition of the invention to a fabric is to spread the composition across the fabric with dam or barrier means such as a knife blade. The knife blade may be lightly pressed against the surface of the fabric or may be elevated above the fabric a slight amount and moved across the fabric. The coating composition moves ahead of the knife blade, with only a thin layer of coating vehicle being applied over the surface of the fabric, and with most of the microspheres tending to be deposited in recesses in the fabric. Because of the low concentration of nonvolatile binder material in the coating vehicle, the vehicle is reduced upon drying to a very thin film. Some penetration of the binder material into the fabric occurs as represented by penetration of the binder material 11 in the attached drawing. Instead of spreading composition across a fabric with a knife blade, the composition may be applied by other techniques such as rotogravure rolls, sprays or spray and knife-blade combinations, or screen printing.

The invention will be further illustrated with the following examples. A coating composition was prepared from the following ingredients.

| | Parts by Weight |
|---|---|
| Aqueous emulsion comprising 54 weight-percent water and 46 weight-percent of a copolymer of ethyl acrylate and methylol acrylamide (Rhoplex HA-8 from Rohm & Haas Company) | 26.6 |
| Aqueous emulsion containing 80 weight-percent water and 20 weight-percent copolymer of ethyl methacrylate and acrylic acid used as thickener (Acrysol ASE95 from Rohm & Haas Company) | 10.7 |
| Anti-foaming agent (Nopco DF160L from Diamond Shamrock Company; diluted with 50 percent water) | 0.9 |
| Ammonium nitrate catalyst enhancing cure of acrylic-based polymer (diluted with 75 percent water) | 0.4 |
| Silane coupling agent (Dow Corning Z6040) | 0.9 |
| Nitrogenous thermosetting resin catalyst agent (Arotex M-3 from American Cyanamid Company) | 0.9 |
| Hemispherically aluminized glass microspheres of approximately 1.92 refractive index averaging 45 micrometers in diameter and ranging between 21 and 63 micrometers in diameter | 6.4 |
| Water | 53.2 |

The described ingredients were mixed together and adjusted to a pH of 8 with ammonium hydroxide to prepare a coating composition having a viscosity of about 1700 centipoises. The microspheres constituted 1.84 volume-percent of the total coating composition and 11.58 percent of the nonvolatile components of the composition.

The composition was coated onto a tightly-woven nylon oxford fabric using a knife blade riding directly against the fabric. The composition was dried by forced air heated to 150° F. (66° C.) and subsequently was heated for 10 minutes at 305° F. (150° C.) to cure the binder material. The fabric was found to be coated with a continuous layer of binder material with microspheres distributed over the surface of the fabric at a density of about 1450 microspheres per square centimeter. Almost all the microspheres rested in recesses in the surface of the fabric. When the fabric was viewed in ordinary daylight the microspheres could not be detected except upon very close inspection with the eye. At nighttime the fabric was brightly retroreflective, providing 2.5 candella of reflected light per square meter of treated surface per lux of incident light.

What is claimed is:

1. Coating composition useful for retroreflectorizing fabrics comprising (a) a dilute coating vehicle that includes film-forming binder material and at least 40 volume-percent of a volatile constituent, and (b) transparent microspheres having a refractive index between about 1.85 and 2 hemispherically coated with specular reflective means and dispersed in the coating vehicle in an amount accounting for about one-third or less of the volume of the nonvolatile portion of the composition.

2. Composition of claim 1 in which the binder material comprises an aqueous emulsion of acrylic-based polymer.

3. Composition of claim 1 in which the microspheres account for about one-fifth or less of the volume of the nonvolatile portion of the composition.

4. Composition of claim 1 in which the vehicle includes at least 70 volume-percent of a volatile constituent.

5. Coating composition useful for retroreflectorizing fabrics comprising (a) a dilute coating vehicle that includes film-forming binder material and at least 70 volume-percent of a volatile constituent, and (b) transparent microspheres having a refractive index between about 1.85 and 2 hemisperhically coated with specular reflective means and dispersed in the coating vehicle in an amount accounting for no more than about one-fifth of the volume of the nonvolatile portion of the composition.

6. Composition of claim 5 in which the binder material comprises an aqueous emulsion of acrylic-based polymer.

7. A method of forming a retroreflective treatment on fabric comprising spreading a composition of claims 1 or 5 across the fabric with barrier means.

* * * * *